W. M. KINGSBURY.
WINDOW REFRIGERATOR.
APPLICATION FILED MAR. 27, 1914.
1,143,205.
Patented June 15, 1915.
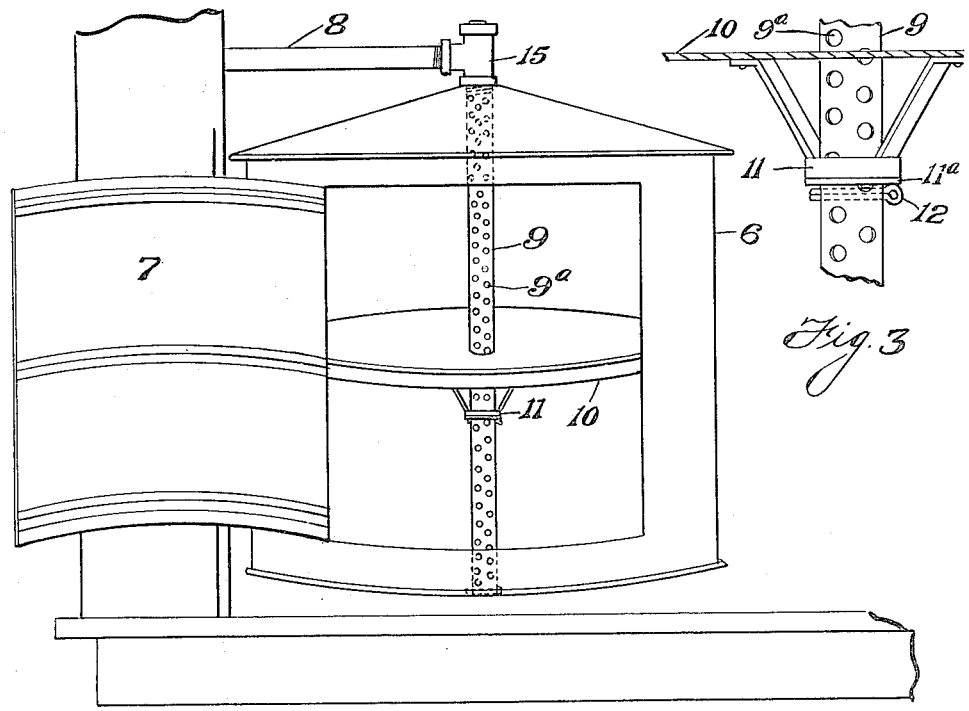
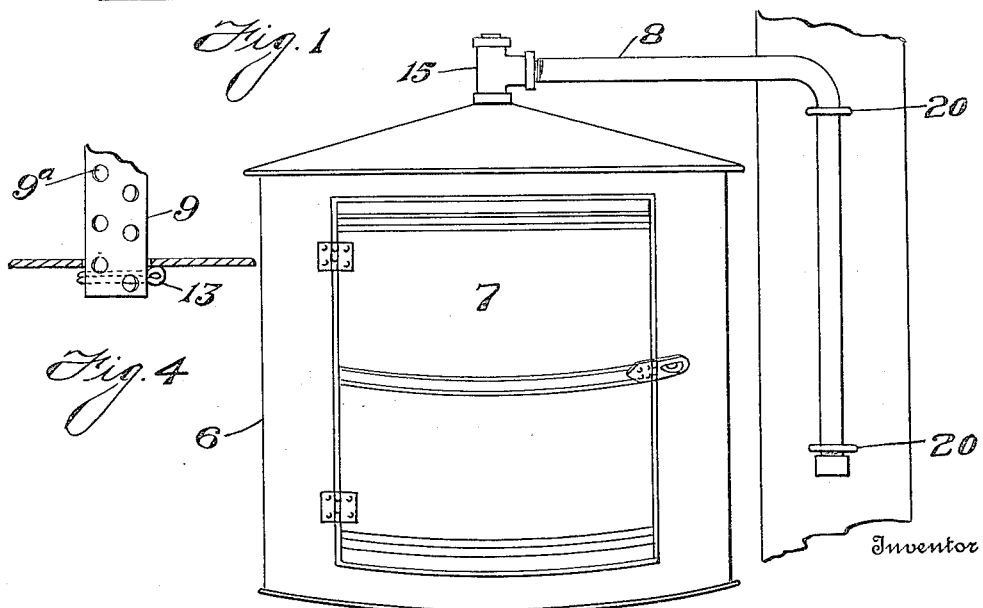
Witnesses
Inventor
William M. Kingsbury
By John A. Bommhardt
Attorney

UNITED STATES PATENT OFFICE.

ELMER A. KILGORE, OF LORIMOR, AND JOHN W. KELLER, OF EAST PERU, IOWA.

PALMETTO-ROOT PLOW.

1,143,204.  Specification of Letters Patent.  Patented June 15, 1915.

Application filed July 6, 1914. Serial No. 849,289.

*To all whom it may concern:*

Be it known that we, ELMER A. KILGORE and JOHN W. KELLER, citizens of the United States, and residents of Lorimor and East Peru, respectively, in the counties of Union and Madison and State of Iowa, have invented a certain new and useful Palmetto-Root Plow, of which the following is a specification.

The object of our invention is to provide a simple, durable and inexpensive means to assist in clearing ground infested by dwarf or blue palmetto, or any other species having a creeping caudex.

A further object is to provide a plow for this purpose which has a horizontal cutting blade, designed to be drawn longitudinally beneath the creeping caudex to sever the fibrous roots which extend downwardly into the ground from the lower portion thereof, and to provide in connection with a blade of this kind means for causing the blade to be drawn into the ground and also to steady it against transverse movement while in operation.

Our invention consists in certain details, in the construction, combination and arrangement of the various parts of our device, whereby the objects contemplated are attained, as hereinafter more fully set forth, pointed out in our claims, and illustrated in the accompanying drawing, in which:

Figure 1 shows a perspective view of our new and improved plow. Fig. 2 shows a side elevation of the same, with a portion broken away and showing the cutting blade in section, to illustrate the manner in which it is operated, and Fig. 3 shows a vertical, transverse, sectional view of a creeping palmetto root, showing the growth of the downwardly extending fibrous roots in two substantially parallel rows.

The numeral 10 indicates two parallel frame members, the forward ends of which are bent inwardly toward each other and have a tongue portion 11 secured between them by means of the bolts 12. The forward end of the tongue portion is provided with a clevis 13 to which the double tree may be attached. The rear end of the tongue 11 extends beyond the extending portions of the members 10 and is provided with a brace 14. The brace 14 has its free end secured to the sides of the members 10 by means of the rivets 15. The central portions of the members 10 are provided with rearwardly and upwardly extending bars 16, the upper ends of which are provided with handles 17. The bars 16 are secured together near the upper ends by means of the transverse rod 18. The braces 19 extend downwardly from the central portions of the bars 16 and are secured to the rear ends of the respective members 10 by means of bolts 20. Each of the side members 10 is provided with a downwardly projecting arm 21. Each of the arms 21 is provided near its central portion with braces 22, which are secured to the members 10 by means of the bolts 15 and 20. The forward edge of the blade 23 is provided with two deep notches 23$^a$, one on each side of its center, the blade at the sides of the notches having the cutting edges 25.

At each end of the blade 23 is a land side blade 26, having its forward end curved downwardly and forwardly from its upper edge to its lower edge, as shown in Fig. 1, and sharpened. The said land side blades 26 are secured to the upwardly extending portion of the blade 23 and to the arms 21 by means of bolts 24 and are arranged parallel with each other and parallel with the tongue 11. These guide blades 26 help to prevent lateral movement of the blade 23 when the plow is in action and the tapered forward end forms a suction which causes the plow to be drawn into the ground.

Mounted on the upper and lower surfaces of the center of the blade 23 are longitudinally arranged supporting bars 24$^a$, and 25$^a$, which extend beyond the forward end of the blade 23 and are welded together at their forward ends and sharpened to form a strong point 26$^a$.

Referring to Fig. 2, the numeral 28 indicates a portion of the creeping caudex and shows the manner in which the fibrous roots 29 extend downwardly into the ground. The portion 30 indicates the upwardly extending portion from which the leaves grow. The fibrous roots 29 usually grow in two substantially parallel rows along the caudex.

When it is desired to remove one of these caudices from the ground, the blade 23 is arranged with its central portion beneath the stem 30 and the blade 23 is moved longitudinally beneath the caudex 28, thereby severing the fibrous roots therefrom.

It is to be understood, of course, that the device may be drawn by any draft animals or traction engine, as is most convenient, through the clevis 13 and the tongue 11. The blade is drawn with the point 26ª between the rows of roots 29. The members 25ª and 24ª reinforce the blade 23 for the heavy work it is required to do. The point 26ª separates the rows of roots 29 and causes them to be properly engaged by the blade 23, which cuts the roots 29 with a shearing movement. The use of the point and the peculiarly shaped blade causes the roots 29 to be divided and help to prevent a tendency toward lateral movement of said cutter. This tendency for lateral movement we have also partly overcome by the blades 26, which on account of their pointed forward ends would tend to eliminate any tendency which the blades might have to move either laterally or upwardly and thereby engage the lower portion of the caudex 28. The use of a comparatively strong point 26ª produces a construction which will break hard ground and yet permit the use of a comparatively thin cutting blade.

The blade 23 may be easily removed for sharpening or repairing by simply removing the bolts 24. It will be seen that we have provided a very rigid and inexpensive plow which will be very steady in its actions and also easy to operate.

It will be understood that some changes may be made in the details of the construction of our device, without departing from its essential features, and it is our intent to cover by this application any such changes which may be included within the scope of the following claims.

We claim as our invention:

1. In a palmetto root plow, the combination of a main frame, a tongue, handles on said frame, a downwardly extending arm on each side of said frame, and a horizontal, transverse cutting blade between the lower ends of said arms, said cutting blade having rearwardly extending notches in its edge on each side of its median longitudinal line.

2. In a palmetto root plow, the combination of a main frame, a tongue, handles on said frame, a downwardly extending arm on each side of said frame, braces between said downwardly extending arms and said frame, a horizontal, transverse cutting blade between the lower ends of said arms, guide blades at the side edges of said cutting blade having at their forward ends downwardly and forwardly extending cutting edges.

3. In a palmetto plow, the combination of a main frame, a tongue, handles on said frame, a downwardly extending arm on each side of said frame, braces between said downwardly extending arms and said frame, a horizontal, transverse cutting blade between the lower ends of said arms, said cutting blade being provided with notches on each side of its longitudinal center, longitudinal braces above and below the center of said blade, extending forwardly from it and united at their forward ends to form a strong, sharp point, a guide blade formed at each side of the cutting blade, said guide blades being arranged longitudinally with said tongue.

4. In a device of the class described, the combination of a main frame, having a tongue and rearwardly extending handles, a downwardly projecting arm on each side of said frame, a transverse cutting bar detachably secured between the lower ends of said downwardly projecting arms, guide blades secured to the sides of said cutting bar, arranged parallel with each other and with said tongue, said guide blades being provided with a point formed with a downwardly and forwardly extending edge.

5. In a device of the class described, a frame having rearwardly extending handles, and a forwardly extending tongue, a downwardly extending arm for each side of said frame, a transverse cutter bar detachably connected between the lower ends of said arms, and a guide blade at each end of said cutter bar and provided with pointed forward ends.

ELMER A. KILGORE.
JOHN W. KELLER.

Witnesses:
  BERT MARTIN,
  FRED E. DUFUR.

Copies of this patent may be obtained for five cents each, by addressing the "Commissioner of Patents. Washington, D. C."